(12) United States Patent
Lin

(10) Patent No.: US 8,578,816 B2
(45) Date of Patent: Nov. 12, 2013

(54) CONNECTING AND ADJUSTING STRUCTURE FOR A CRANK ASSEMBLY

(76) Inventor: Chang Hui Lin, Changhu (TW)

( * ) Notice: Subject to any disclaimer, the term of this patent is extended or adjusted under 35 U.S.C. 154(b) by 678 days.

(21) Appl. No.: 12/790,800

(22) Filed: May 29, 2010

(65) Prior Publication Data

US 2011/0290069 A1 Dec. 1, 2011

(51) Int. Cl.
*B62M 3/00* (2006.01)

(52) U.S. Cl.
CPC ...................................... *B62M 3/003* (2013.01)
USPC ........................................ 74/594.2; 74/594.1

(58) Field of Classification Search
USPC ................................ 74/594.1, 594.2; 280/260
IPC ....................................................... B62M 3/00
See application file for complete search history.

(56) References Cited

U.S. PATENT DOCUMENTS

| 7,234,373 | B2 * | 6/2007 | Yamanaka | 74/594.1 |
|---|---|---|---|---|
| 7,523,685 | B2 * | 4/2009 | French | 74/594.1 |
| 7,562,604 | B2 * | 7/2009 | Fukui | 74/594.1 |
| 7,856,903 | B2 * | 12/2010 | Yamanaka et al. | 74/594.1 |
| 2003/0172771 | A1 * | 9/2003 | Nanko et al. | 74/594.2 |
| 2005/0116438 | A1 * | 6/2005 | Wang et al. | 280/210 |
| 2008/0245160 | A1 * | 10/2008 | Watarai et al. | 73/862.321 |
| 2010/0301581 | A1 * | 12/2010 | Patterson | 280/260 |
| 2011/0120262 | A1 * | 5/2011 | Edwards | 74/594.1 |

* cited by examiner

*Primary Examiner* — Vinh Luong

(57) ABSTRACT

A connecting and adjusting structure for a crank assembly used in a bicycle contains a first tube of a first connector including a first hollow portion, the first connector including a first bearing seat to receive a first ball bearing, the first bearing seat includes a first engaging tab, a first adjusting rib, and the first tube, a second connector including a second bearing seat to receive a second ball bearing, a dustproof cover, and a retaining ring, the second bearing seat including a second engaging tab, a second adjusting rib, and a second tube, a second crank including a central shank with plural T-shaped teeth and second internal screws, a first crank including a hollow post with a Tee groove fixed to engage with the T-shaped teeth, and a screw is inserted through the hollow post to be screwed with the second internal screws.

4 Claims, 6 Drawing Sheets

CONNECTING AND ADJUSTING STRUCTURE FOR A CRANK ASSEMBLY

BACKGROUND OF THE INVENTION

1. Field of the Invention

The present invention relates to a connecting and adjusting structure, and more particularly to a connecting and adjusting structure for a crank assembly of a bicycle.

2. Description of the Prior Art

A conventional crank assembly of a bicycle is provided to be pedaled by a rider and contains a crank device installed behind a tube member, and includes a central shaft, the central shaft includes a first and a second ball bearings disposed on two sides thereof and fixed in a bottom bracket, and a retaining ring is used to screw the central shaft with the bottom bracket. However, such a connecting method is time consuming and complicated, and a gap results from the working process to loose the crank assembly.

Moreover, the ball bearing contact with the crank at a small area or some points that will deform the crank during pedaling the pedal.

The present invention has arisen to mitigate and/or obviate the afore-described disadvantages.

SUMMARY OF THE INVENTION

The primary object of the present invention is to provide a connecting and adjusting structure for a crank assembly which is capable of overcoming the shortcomings of the conventional a hydraulic brake.

Further object of the present invention is to provide a connecting and adjusting structure for a crank assembly that the first and the second connectors are screwed together to be further retained on two sides of the bottom bracket to eliminate a gap among the bottom bracket, the first and the second connectors and the first and the second cranks which results from the working process, and to assemble related components of bicycle and enhance stability of the rotating crank shaft while pedaling the pedal.

Another object of the present invention is to provide a connecting and adjusting structure for a crank assembly that the first and the second ball bearings of the first and the second connectors are replaced easily when they are damaged, and the retaining ring is used to retain the dustproof cover and the second ball bearing with the second crank to adjust the distance among the second crank, the bottom bracket, and the first crank quickly.

To obtain the above objectives, a connecting and adjusting structure for a crank assembly provided by the present invention contains:

a first connector, a second connector, a first crank, a second crank, a first ball bearing, a second ball bearing, a retaining ring, a dustproof cover, a screw, and a chainwheel, wherein a first tube of the first connector includes a first hollow portion formed therein, the first connector includes a first bearing seat disposed on a front end of the first tube thereof to receive the first ball bearing, and the first bearing seat includes a first engaging tab, a first adjusting rib, and the first tube mounted around a rear side thereof, the second connector includes a second bearing seat disposed on a rear end of a second tube thereof to receive the second ball bearing, the dustproof cover, and the retaining ring, the second bearing seat includes a second engaging tab, a second adjusting rib, and the second tube fixed on a front side thereof, the second crank includes a central shank disposed on a center thereof, and the central shank is hollow and includes a plurality of T-shaped teeth arranged around a distal end thereof and second internal screws arranged therein, the first crank includes a hollow post mounted on a center thereof, the hollows post includes a Tee groove fixed therein to engage with the T-shaped teeth of the central shank of the second crank, and the screw is inserted through the hollow post of the first crank to be screwed with the second internal screws of the first crank.

DETAILED DESCRIPTION OF THE PREFERRED EMBODIMENTS

Figure 1:
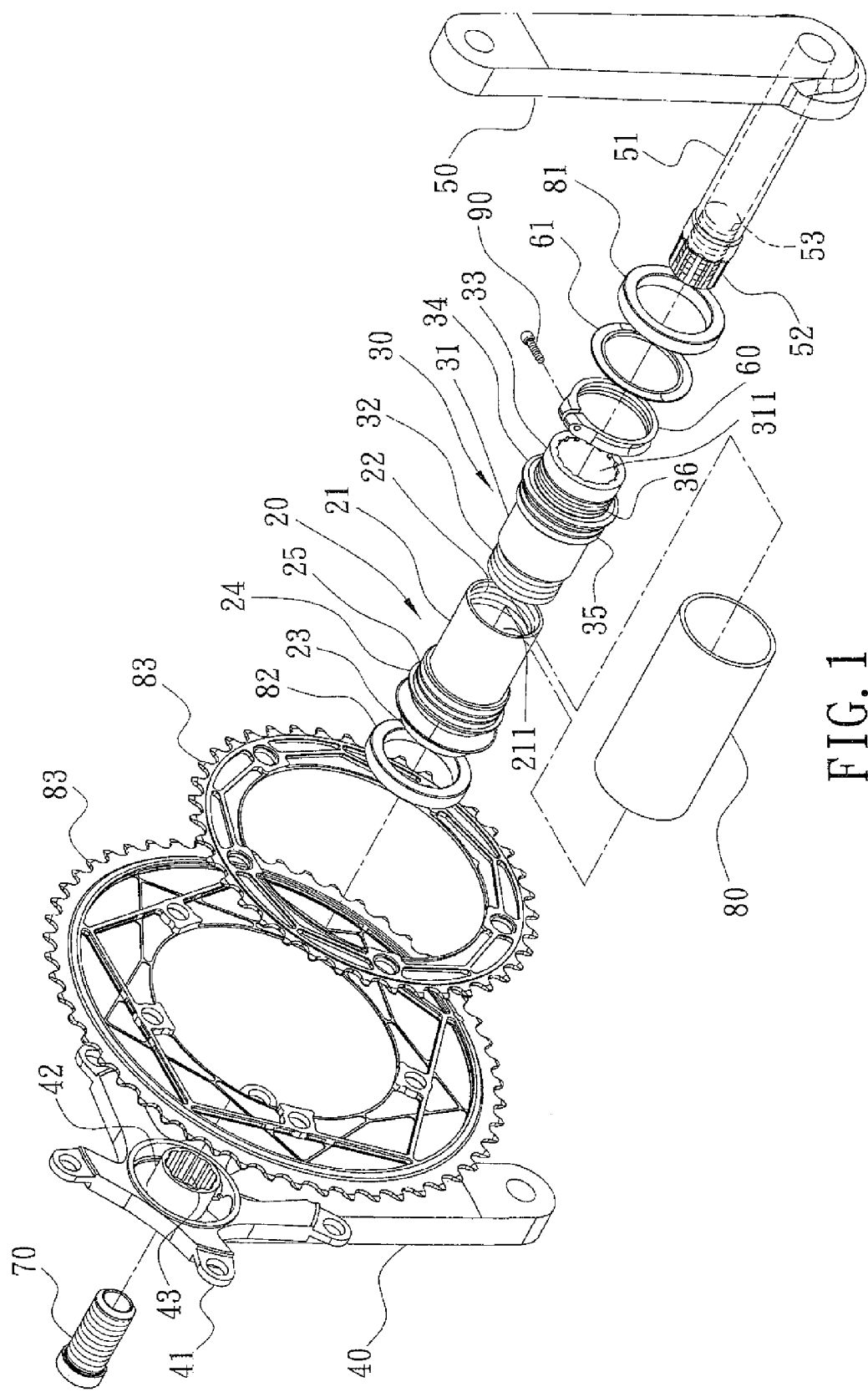
FIG. 1 is a perspective view showing the exploded components of a connecting and adjusting structure for a crank assembly according to a preferred embodiment of the present invention.
Figure 2:
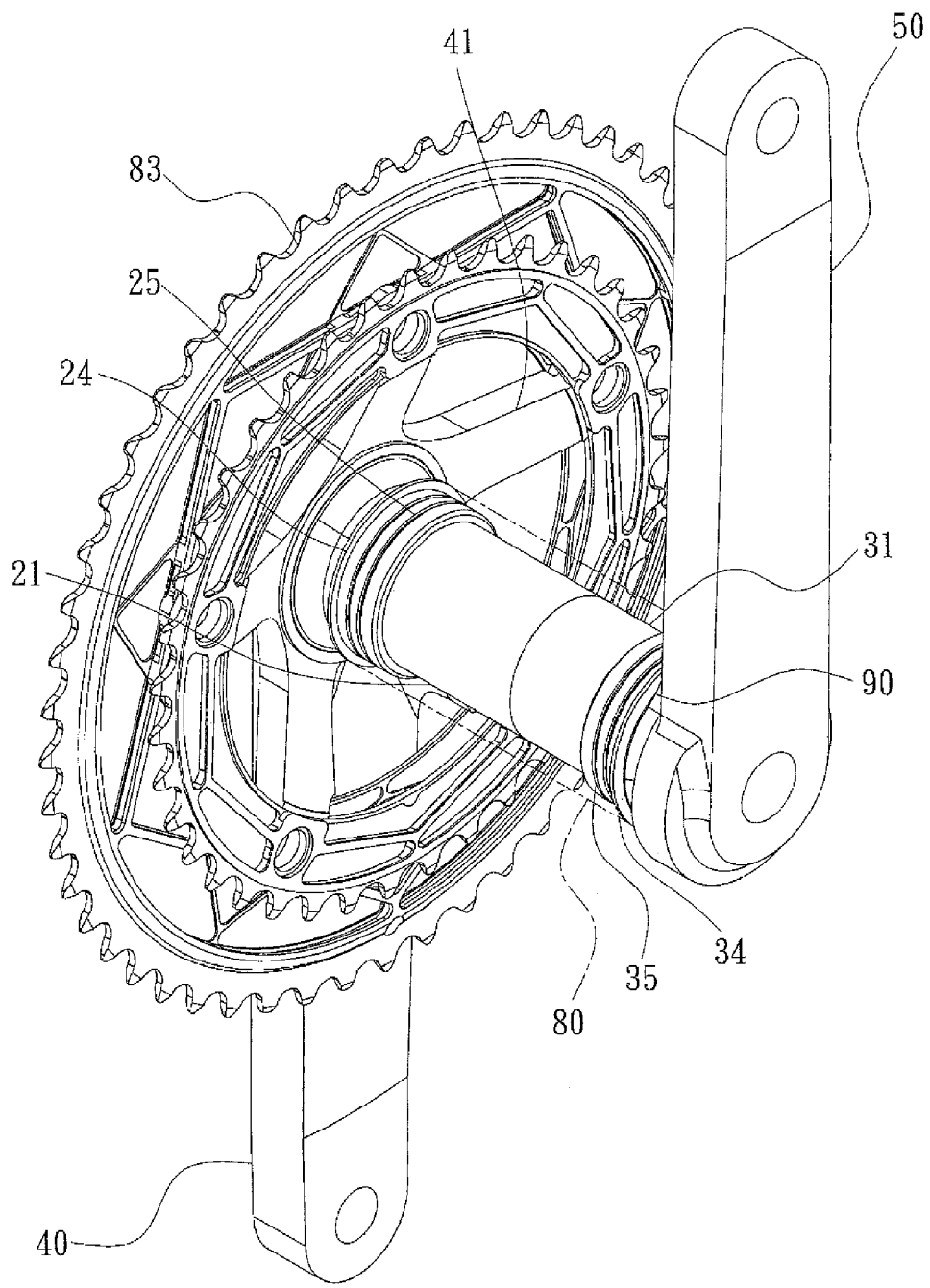
FIG. 2 is a perspective view showing the assembly of the connecting and adjusting structure for the crank assembly according to the preferred embodiment of the present invention.
Figure 3:
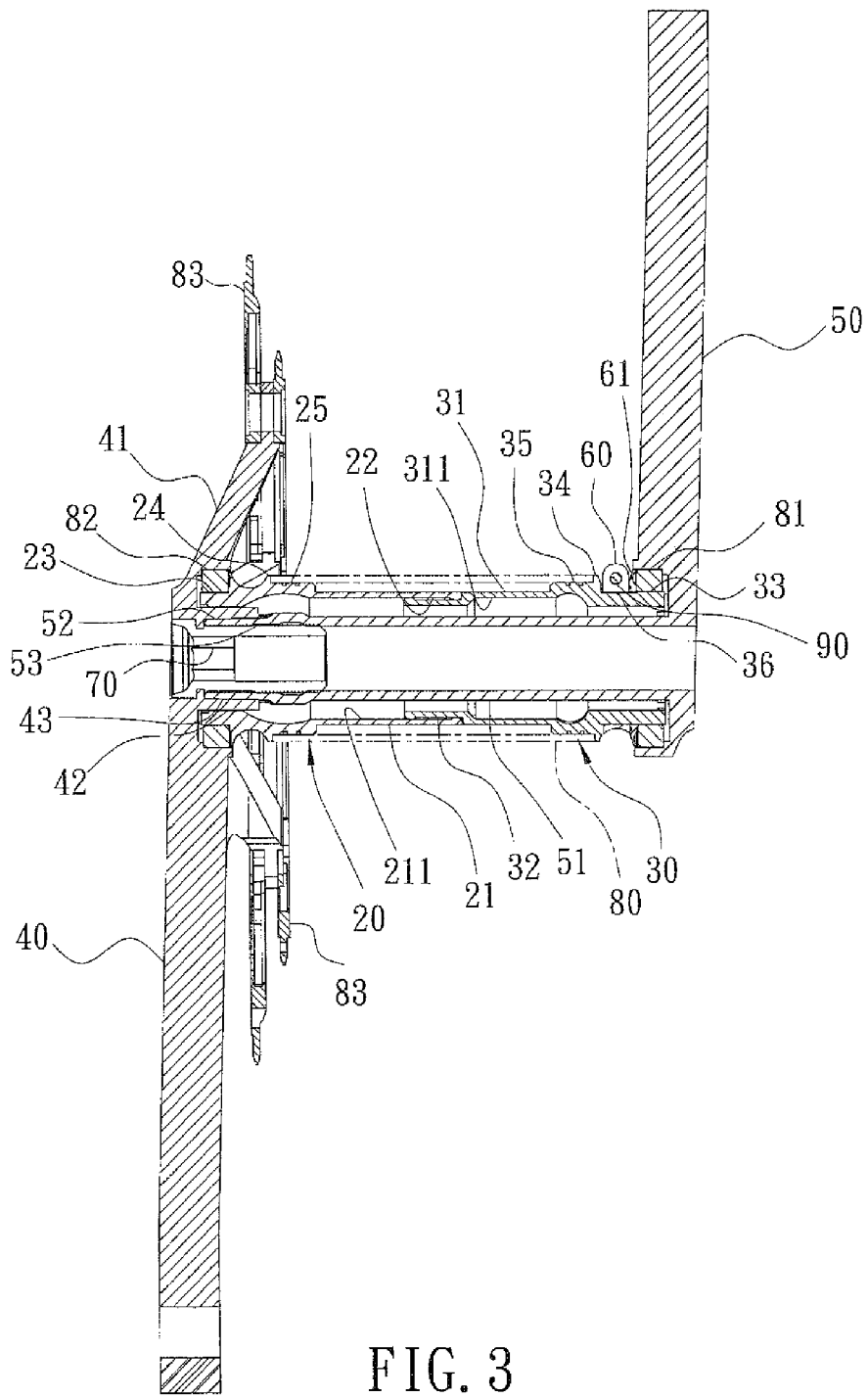
FIG. 3 is a cross sectional view showing the assembly of the connecting and adjusting structure for the crank assembly according to the preferred embodiment of the present invention.
Figure 4:
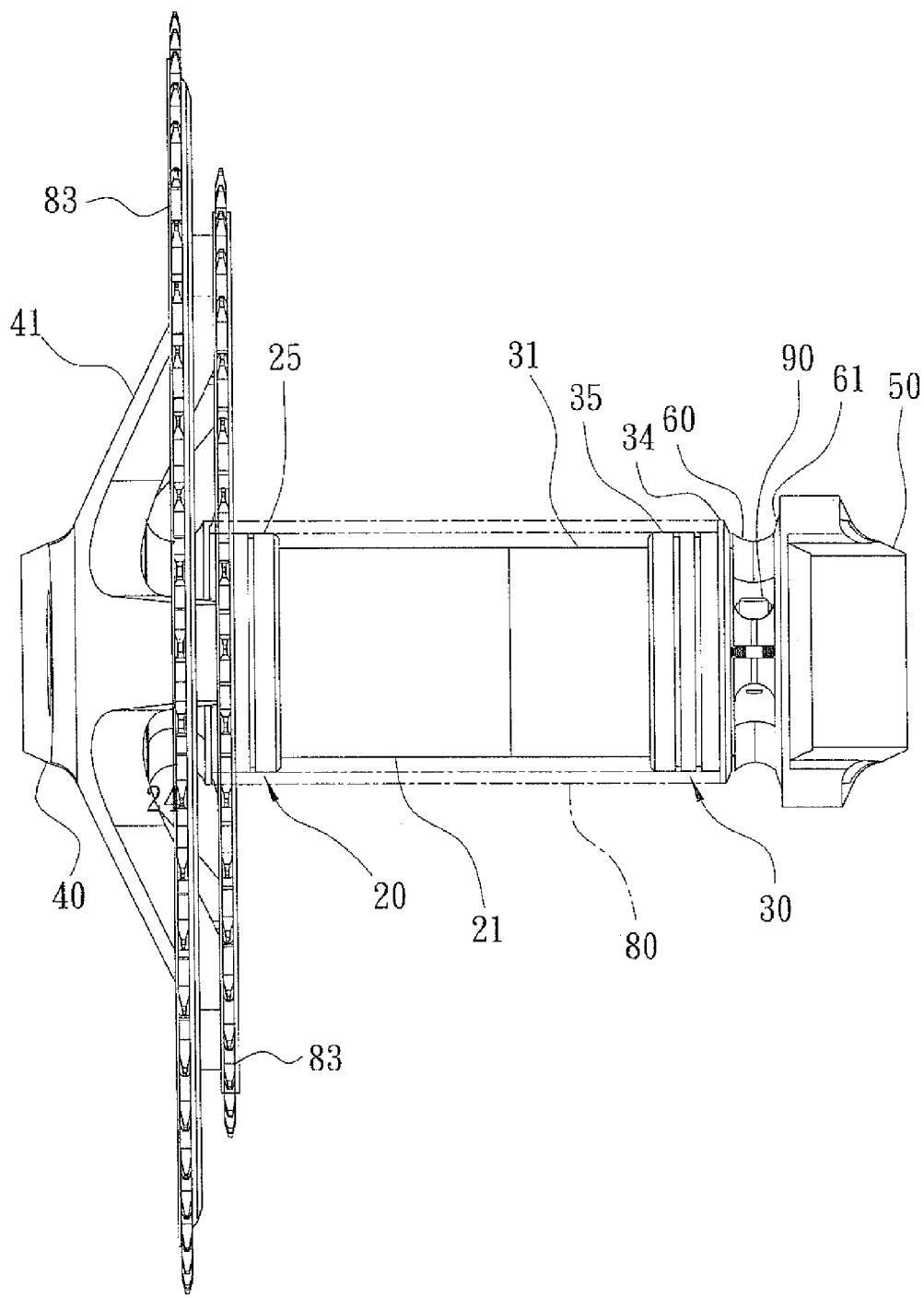
FIG. 4 is a bottom plan view showing the assembly of the connecting and adjusting structure for the crank assembly according to the preferred embodiment of the present invention.
Figure 5:
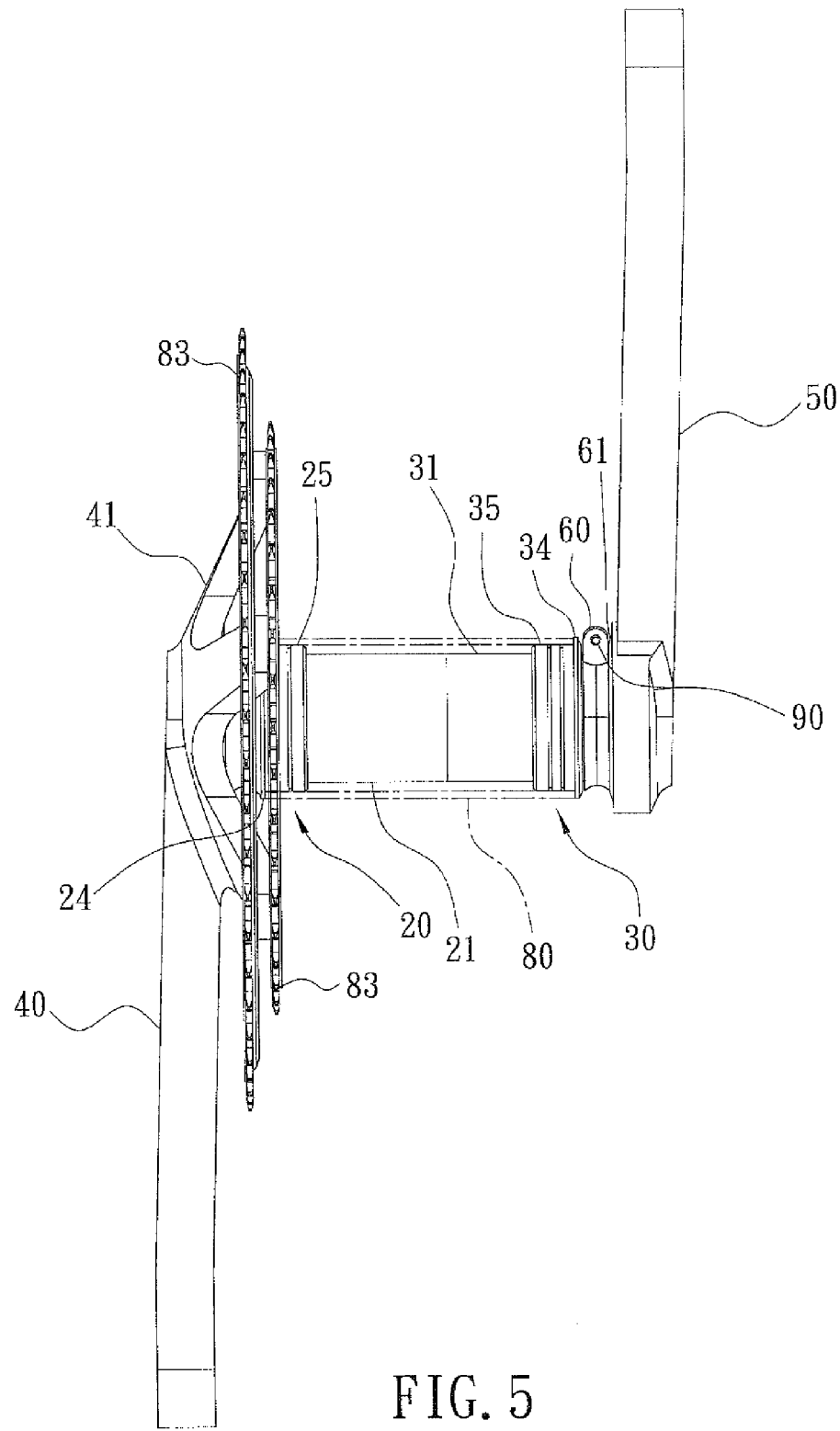
FIG. 5 is a front plan view showing the assembly of the connecting and adjusting structure for the crank assembly according to the preferred embodiment of the present invention.

The present invention will be clearer from the following description when viewed together with the accompanying drawings, which show, for purpose of illustrations only, the preferred embodiment in accordance with the present invention.

Referring to FIGS. 1-6, a connecting and adjusting structure for a crank assembly in accordance with a preferred embodiment of the present invention is used in a bottom bracket 80 and a crank shaft of a bicycle, and comprises a first connector 20, a second connector 30, a first crank 40, a second crank 50, a first ball bearing 81, a second ball bearing 82, a retaining ring 60, a dustproof cover 61, a screw 70, and a chainwheel 83, wherein a first tube 21 of the first connector 20 includes a first hollow portion 211 formed therein, the first hollow portion 211 includes inner threads 22 arranged on a rear side thereof to screw with outer threads 32 of the second connector 30, the first connector 20 includes a first bearing seat 23 disposed on a front end of the first tube 21 thereof to receive the first ball bearing 81, and the first bearing seat 23 includes a first engaging tab 24, a first adjusting rib 25, and the first tube 21 mounted around a rear side thereof, a second tube 31 of the second connector 30 includes a second hollow portion 311 formed therein, and the second hollow portion 311 includes the outer threads 32 arranged on a front side thereof to screw with the inner threads 22 of the first connector 20, the second connector 30 includes a second bearing seat 33 disposed on a rear end of the second tube 31 thereof to receive the second ball bearing 82, the dustproof cover 61, and the retaining ring 60, the second bearing seat 33 includes a second engaging tab 34, a second adjusting rib 35, and the second tube 31 fixed on a front side thereof, and includes external screws 36 secured on a front end thereof to screw with first internal screws 62 of the retaining ring 60 so that the retaining ring 60 is rotated to push the dustproof 61 to contact with the first ball bearing 81 tightly, thus adjusting a distance among the second crank 50, the bottom bracket 80, and the first crank 40. The second crank 50 includes a central shank 51 disposed on a center thereof, and the central shank 51 is hollow and includes a plurality of T-shaped teeth 52 arranged around a distal end thereof, second internal screws 53 arranged therein. The first crank 40 includes a paw portion 41 disposed on an outer rim of an upper side thereof to lock the chainwheel 83, includes a hollow post 42 mounted on a center thereof, the hollows post 42 includes a Tee groove 43 fixed therein to engage with the T-shaped teeth 52 of the central shank 51 of the second crank 50, and then the screw 70 is inserted through the hollow post 42 of the first crank 40 to be screwed with the second internal screws 53 of the first crank 40, thus obtaining the connecting and adjusting structure of the crank assembly.

Thereby, the first and the second connectors 20, 30 are screwed together to be further retained on two sides of the bottom bracket 80 to eliminate a gap among the bottom bracket 80, the first and the second connectors 20, 30, and the first and the second cranks 40, 50 which results from the working process, and to assemble related components of bicycle and enhance stability of the rotating crank shaft while pedaling the pedal. Furthermore, the first and the second ball bearings 81, 82 of the first and the second connectors 20, 30 are replaced easily when they are damaged, and the retaining ring 60 is used to retain the dustproof cover 61 and the second ball bearing 82 with the second crank 50 to adjust the distance among the second crank 50, the bottom bracket 80, and the first crank 40 quickly.

Figure 6:
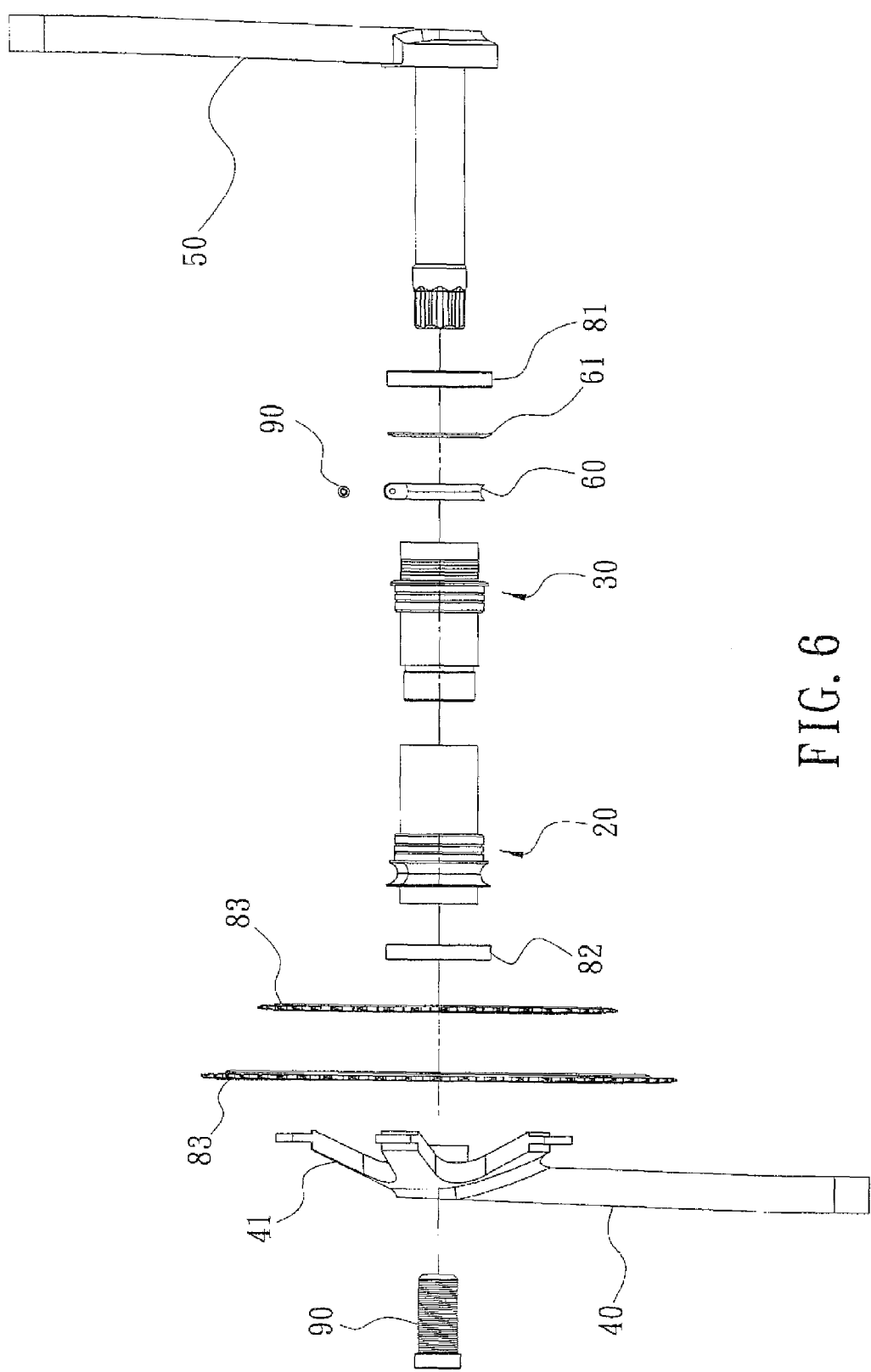
FIG. 6 is a plan view showing the exploded components of the connecting and adjusting structure for the crank assembly according to the preferred embodiment of the present invention.

As shown in FIG. 6, in assembly, the first and the second connectors 20, 30 are screwed together to be retained on the two sides of the bottom bracket 80 and further to be connected with a bicycle frame, and then the paw portion 41 of the first crank 40 is coupled with the chainwheel 83 and the second ball bearing 82 and is further fitted to the first connector 20, thereafter the retaining ring 60 and the dustproof cover 61 are fitted into the second bearing seat 33 of the second connector 30 so that the second crank 50 is connected with the first ball bearing 81 and fitted into the second connector 30, and then the screw 70 is inserted into the hollows post 42 of the first crank 40 to screw with the second internal screws 53 so that the first and the second cranks 40, 50 are retained tightly with each other, and the retaining ring 60 is rotated tightly to adjust the first ball bearing 81 and the distance among the second crank 50, the bottom bracket 80, and the first crank 40, thereafter a screwing element 90 is applied to engage the retaining ring 60 with the second bearing seat 33 of the second connector 30, thus finishing assembly.

While we have shown and described various embodiments in accordance with the present invention, it is clear to those skilled in the art that further embodiments may be made without departing from the scope of the present invention.

What is claimed is:

1. A connecting and adjusting structure for a crank assembly being used in a bottom bracket of a bicycle, and comprising:

a first connector, a second connector, a first crank, a second crank, a first ball bearing, a second ball bearing, a retaining ring, a dustproof cover, a screw, and a chainwheel, wherein a first tube of the first connector includes a first hollow portion formed therein, the first connector includes a first bearing seat disposed on a front end of the first tube thereof to receive the first ball bearing, and the first bearing seat includes a first engaging tab, a first adjusting rib, and the first tube mounted around a rear side thereof, the second connector includes a second bearing seat disposed on a rear end of a second tube thereof to receive the second ball bearing, the dustproof cover, and the retaining ring, the second bearing seat includes a second engaging tab, a second adjusting rib, and the second tube fixed on a front side thereof, the second crank includes a central shank disposed on a center thereof, and the central shank is hollow and includes a plurality of T-shaped teeth arranged around a distal end thereof and second internal screws arranged therein, the first crank includes a hollow post mounted on a center thereof, the hollows post includes a Tee groove fixed therein to engage with the T-shaped teeth of the central shank of the second crank, and the screw is inserted through the hollow post of the first crank to be screwed with the second internal screws of the first crank.

2. The connecting and adjusting structure for a crank assembly as claimed in claim 1, wherein the first hollow portion includes inner threads arranged on a rear side thereof to screw with outer threads of the second connector.

3. The connecting and adjusting structure for a crank assembly as claimed in claim 1, wherein the second bearing seat includes external screws secured on a front end thereof to screw with first internal screws of the retaining ring so that the retaining ring is rotated to push the dustproof to contact with the first ball bearing tightly.

4. The connecting and adjusting structure for a crank assembly as claimed in claim 1, wherein the first crank includes a paw portion disposed on an outer rim of an upper side thereof to lock the chainwheel.

* * * * *